United States Patent [19]

Uchida

[11] Patent Number: 4,524,613

[45] Date of Patent: Jun. 25, 1985

[54] ADJUSTING DEVICE FOR ADJUSTING INITIAL INJECTION LIFT OF A DOUBLE INJECTION TYPE FUEL INJECTION VALVE

[75] Inventor: Kazuo Uchida, Higashimatsuyama, Japan

[73] Assignee: Diesel Kiki Co., Ltd., Tokyo, Japan

[21] Appl. No.: 558,940

[22] Filed: Dec. 7, 1983

[30] Foreign Application Priority Data

Dec. 13, 1982 [JP] Japan .......................... 57-188318[U]

[51] Int. Cl.[3] ............................................ G01M 15/00

[52] U.S. Cl. .................................................. 73/119 A

[58] Field of Search .............. 73/119 A, 4; 239/533.3, 239/533.5, 533.9, 584

[56] References Cited

U.S. PATENT DOCUMENTS 3,026,723 3/1962 Cief .................................. 73/119 A 4,390,129 6/1983 Uchida ............................ 239/533.5

FOREIGN PATENT DOCUMENTS 1193472 3/1965 France ............................. 73/119 A 57-145760 9/1982 Japan .

*Primary Examiner*—Jerry W. Myracle

*Attorney, Agent, or Firm*—Frishauf, Holtz, Goodman & Woodward

[57] ABSTRACT

An adjusting device for adjusting the initial injection lift of a double-injection type fuel injection valve comprises a hollow tubular holder which has one end portion, an axially intermediate portion and another end portion provided, respectively, with support elements for supporting a measuring instrument, mounting elements for mounting the holder on a second nozzle spring-accommodating hollow member of the fuel injection valve, and urging elements disposed in the holder for urging a second movable spring-seat of the fuel injection valve against its stationary seat to hold the former in close contact with the latter. The mounting elements allow axial displacement of the holder relative to the hollow member of the fuel injection valve. The above elements of the holder are so constructed as to permit free axial movement of an elongate probe of the measuring instrument therethrough.

6 Claims, 6 Drawing Figures

ADJUSTING DEVICE FOR ADJUSTING INITIAL INJECTION LIFT OF A DOUBLE INJECTION TYPE FUEL INJECTION VALVE

BACKGROUND OF THE INVENTION

This invention relates to an adjusting device for fuel injection valves, and more particularly to an adjusting device for adjusting the initial injection lifts of double-injection type fuel injection valves.

In a conventional diesel engine, there is a problem that while the fuel injection rate, i.e. injection quantity per unit time should be set at a suitably high value for improvement of the output characteristics of the engine as well as prevention of the emission of nitrogen oxides, an increased fuel injection rate can lead to a correspondingly shortened injection period, which causes a reduction in the combustion duration, resulting in a combustion noise, and can also cause an increase in maximum pressure within the engine cylinders, as well as irregular fuel injection.

To solve the above problem, fuel injection valves have been proposed by the assignee of the present application in U.S. Pat. No. 4,390,129 issued June 28, 1983 and Japanese Provisional Utility Model Publication No. 57-145760 issued Sept. 13, 1982, which are a double-injection type having first and second nozzle springs, wherein fuel injection takes place in two steps in such a manner that the first nozzle spring is compressed by an initial injection valve opening pressure to cause lifting of the nozzle needle for initial injection, and subsequently the first and second nozzle springs are both compressed by a main fuel injection valve opening pressure to cause further lifting of the nozzle needle for main injection. This double injection reduces the injection rate through the whole injection period, thus substantially overcoming all the aforementioned drawbacks of combustion noise, emission of nitrogen oxides and irregular injection.

The above proposed double-injection type fuel injection valves commonly comprise a first movable spring seat coupled to a nozzle needle for lifting therewith and supporting the first nozzle spring, a second movable spring seat supporting the second nozzle spring, a seat held stationary at a predetermined axial location and on which the second movable spring seat is seated, a shim interposed between the seat and the second movable spring seat for maintaining the second movable spring seat in its seated position spaced from the first movable spring seat in its seated position by a preset gap determining a desired initial injection lift, and a hollow member accommodating at least the second nozzle spring.

In these double-injection type fuel injection valves constructed as above, the operation of adjusting the above gap determining the initial injection lift is rather complicated and troublesome if it is made by the use of conventional adjusting means. Further, it is difficult to adjust the gap to a correct value with accuracy by the use of conventional adjusting means.

SUMMARY OF THE INVENTION

It is the object of the invention to provide an adjusting device for adjusting the initial injection lifts of double-injection type fuel injection valves, which enables adjustment of the initial injection lift gaps of the fuel injection valves as well as ascertainment of the adjusted gap values, with accuracy and ease.

The present invention provides an adjusting device for adjusting the initial injection lift of a double-injection type fuel injection valve, which comprises: a hollow tubular holder for holding a measuring instrument having an elongate probe, the holder having a through hole formed therein along its axis for the elongate probe to extend therethrough; support means provided at one end portion of the holder for supporting the measuring instrument; mounting means provided at an axially intermediate portion of the holder for mounting the holder on a hollow member of the fuel injection valve, which accommodates at least the second nozzle spring, while allowing axial displacement of the holder relative to the hollow member; and urging means for urging the second movable spring seat of the fuel injection valve against its seat held stationary at a predetermined axial location to hold the former in close contact with the latter. The support means, the mounting means and the urging means are so constructed as to permit free axial movement of the elongate probe of the measuring instrument therethrough.

The above and other objects, features and advantages of the invention will be more apparent from the ensuing detailed description taken in conjunction with the accompanying drawings.

DETAILED DESCRIPTION

Figure 1:
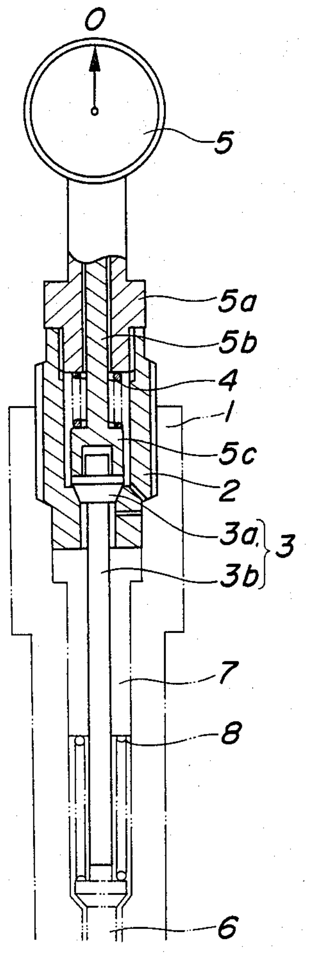
FIG. 1 is a schematic view showing a conventional manner of adjusting the initial injection lift of a double-injection type fuel injection valve.
Figure 2:
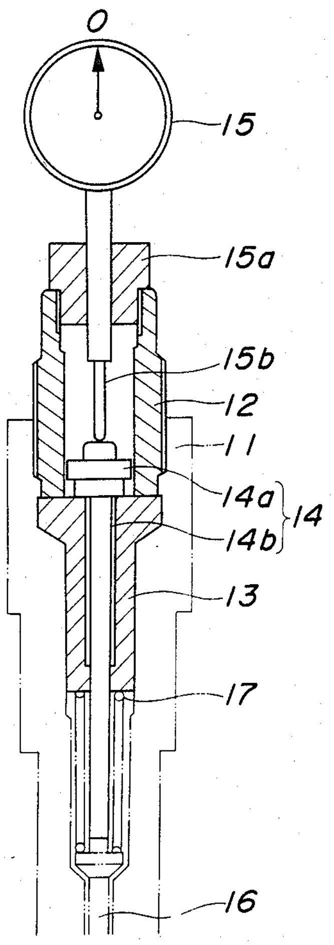
FIG. 2 is a schematic view showing another conventional manner of adjusting the initial injection lift of another double-injection type fuel injection valve.

Referring first to FIGS. 1 and 2, there are shown conventional manners of adjusting the initial injection lifts of double-injection type fuel injection valves.

FIG. 1 shows an initial injection lift-adjusting manner applied to a double-injection type fuel injection valve disclosed in Japanese Provisional Utility Model Publication No. 57-145760, hereinbefore referred to. In adjusting the initial injection lift by means of the adjusting device in FIG. 1, first, a hollow threaded member 2 is removed together with the second movable spring seat 3 engaging therewith, from the nozzle holder 1, and also an adjusting threaded member, not shown, for adjusting the setting load of the second nozzle spring 4 is removed from an end of the threaded member 2 remote from the nozzle holder, in which it has been threadedly fitted. A fitting portion 5*a* of a dial gauge 5 is screwed into the above end of the hollow threaded member 2, and a probe 5*c* formed at the lower end of a measuring rod 5*b* of the dial gauge 5 is brought into contact with a spring seating portion 3*a* of the second movable spring seat 3, with the second nozzle spring 4 interposed between the lower end face of the fitting portion *5a* of the gauge 5 and an upper surface of the probe *5c* of the measuring rod *5b* of the gauge 5. In this position, the pointer of the dial gauge 5 is set to zero. Then, the hollow threaded member 2 is screwed into the nozzle holder 1, together with the dial gauge 5, the second movable spring seat 3 and the second nozzle spring 4 incorporated therein so that the lower end of a push rod *3b* of the second movable spring seat 3 is brought into contact with the head of the first movable spring seat 6 supporting the first nozzle spring 8. At this time, a value h in the scale of the dial gauge 5 pointed by the pointer is read. A shim, not shown, is selected which has a thickness equal to the sum of this value h and a desired value Δl of initial injection lift. The selected shim is placed between the hollow threaded member 2 and a spacer 7 disposed under the threaded member 2 to thereby set the initial injection lift. According to this adjusting manner, in adjusting the initial injection lift, the second nozzle spring 4 has to be removed from the hollow threaded member 2 and again put into the same member in a manner interposed between the lower surface of the fitting portion *5a* of the dial gauge 5 and the upper surface of the probe *5c* of the measuring rod *5b* of same. This is rather hard and troublesome to carry out.

FIG. 2 shows an initial injection lift-adjusting manner applied to a double-injection type fuel injection valve disclosed in U.S. Pat. No. 4,390,129, hereinbefore referred to. According to this adjusting manner, a hollow threaded member 12 and a spacer 13 disposed under the member 12 are removed from the nozzle holder 11, together with the second movable spring seat 14 engaging therewith. Also, an adjusting threaded member, not shown, for adjusting the setting load of the second nozzle spring, not shown, and the second nozzle spring are both removed from the hollow threaded member 12. A dial gauge 15 is mounted onto the hollow threaded member 12 by means of its fitting member *15a*, and the probe provided at tip of a measuring rod *15b* of the gauge 15 is brought into contact with the head or spring seating portion *14a* of the second movable spring seat 14. At this time, the pointer of the dial gauge 15 is set to zero. Then, the spacer 13 and the hollow threaded member 12 are mounted into the nozzle holder 11, together with the dial gauge 15 mounted thereon so that the lower end of the push rod *14b* of the second movable spring seat 14 is brought into contact with the head of the first movable spring seat 16 for the first nozzle spring 17, and then a value h in the scale of the dial gauge 15 pointed by the pointer is read. A shim, not shown, having a thickness equal to the sum of this value h and a desired value Δl of initial injection lift is selected and placed between the second movable spring seat 14 and the spacer 13 to thereby set the initial injection lift. According to this adjusting manner, before setting the pointer of the dial gauge 15 to zero, not only the adjusting threaded member for the second nozzle spring, the second nozzle spring and the second movable spring seat 14 but also the spacer 13 and the hollow threaded member 12 have to be removed from the nozzle holder 11, which takes much time. Furthermore, in the hollow threaded member 12 and/or the fitting portion *15a* of the dial gauge 15, due to the machining tolerances, the line which connects between a crest of each screw thread and a root diametrically corresponding to the crest and crosses with the axis of the screw thread is not normal to the axis of the screw thread. As a consequence, the axis of the fitting portion *15a* of the dial gauge 15, i.e. the axis of the measuring rod *15b* is not normal to a line extending parallel with the lower end face of the hollow threaded member 12 disposed in contact with the upper surface of the spacer 13. Moreover, since there is not provided any means for holding the second movable spring seat 14 in face-to-contact with the upper surface of the spacer 13, the spring seat 14, i.e. the head spring seating portion *14a* can be inclined with respect to the axis of the spacer 13, or the push rod *14b* of the spring seat 14 can be dislocated from its position in close contact with the first movable spring seat 16, resulting in an inaccurate adjusted value of the initial injection lift.

Figure 3:
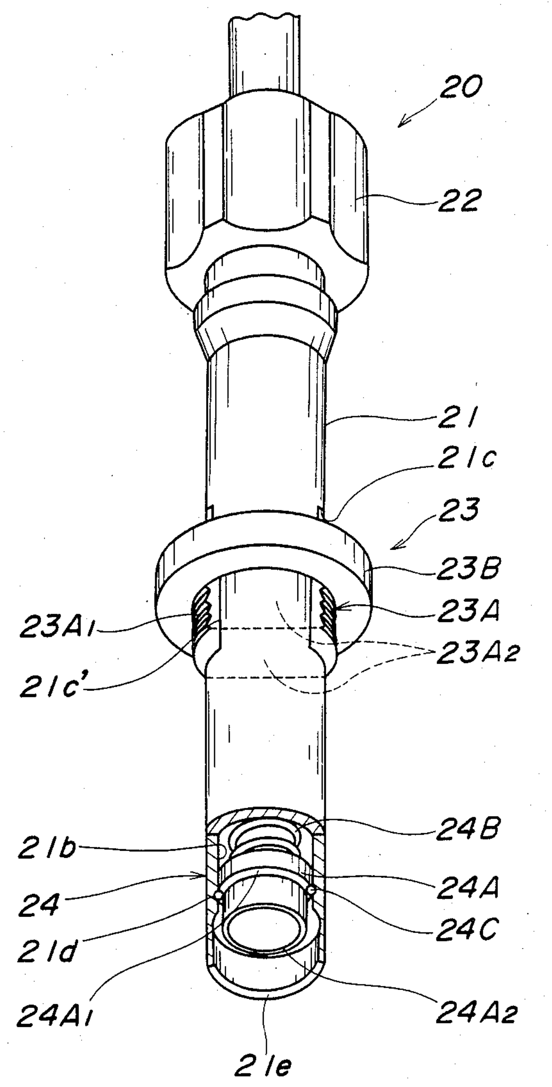
FIG. 3 is a perspective view, partly broken away, of an adjusting device according to an embodiment of the present invention.
Figure 4:
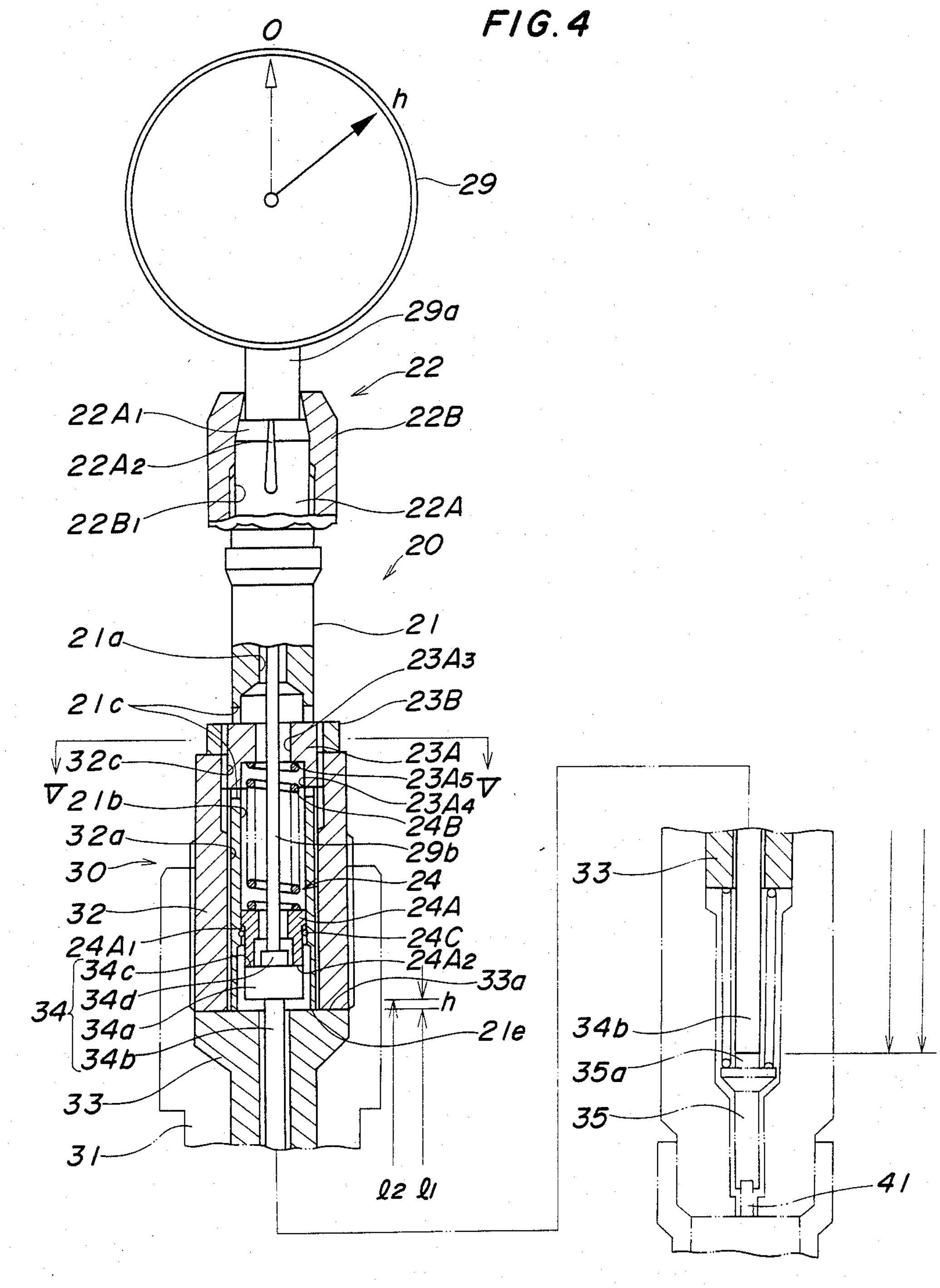
FIG. 4 is a longitudinally sectional view of the adjusting device of FIG. 3 in a state mounted on a double-injection type fuel injection valve, for adjusting the initial injection lift.

Referring next to FIGS. 3 and 4, there is illustrated an initial injection lift-adjusting device for fuel injection valves, according to an embodiment of the present invention. The adjusting device 20 according to the invention basically comprises a measuring instrument holder 21 formed of a hollow tubular member, support means 22 provided at one end portion of the holder 21 for supporting a measuring instrument such as a dial gauge 29, mounting means 23 provided at an axially intermediate portion of the holder 21 for mounting the holder 21 on a double-injection type fuel injection valve 30, and urging means 24 provided at the other end portion of the holder 21 for urging the second movable spring seat 34 of the fuel injection valve 30 against a seating surface *33a* held at a predetermined axial location in the fuel injection valve 30 to hold the same spring seat 34 in close face-to-face contact with the seating surface *33a*. The fuel injection valve 30 illustrated in FIG. 4 is identical with the one disclosed in U.S. Pat. No. 4,390,129, previously referred to and shown in FIG. 2. The measuring instrument holder 21 has a through hole formed therein along its axis and consisting of a hole *21a* with a smaller diameter extending from the above one end portion to an axially intermediate portion thereof, and a hole *21b* with a larger diameter extending continuously from the hole *21a* to the above other end portion.

The support means 22 is formed by a screw chuck having a conventional structure in the illustrated embodiment. As shown in FIG. 4, the screw chuck comprises a hollow tubular inner member 22A through which a support rod *29a* of the dial gauge 29 as the measuring instrument is to be fitted, and a hollow tubular outer member 22B threadedly fitted over the inner member 22A. The outer member 22B has an axially extending central hole $22B_1$ which has its inner peripheral surface threaded at one half portion and tapered at the other half portion. The threaded half portion of the central hole $22B_1$ of the outer member 22B threadedly engages a threaded end portion of the inner member 22A, while the tapered other half portion of the central hole $22B_1$ of the outer member 22B is disposed for gripping contact with a gripping portion $22A_1$ of the inner member 22A. The gripping portion $22A_1$ has a slit $22A_2$ formed therein so that as the outer member 22B is screwed onto the inner member 22A, the tapered half portion of the former causes the gripping portion $22A_1$ to be radially inwardly deformed to grip the support rod *29a* of the dial gauge 29 to thereby support the dial gauge 29 by the support means 22.

Figure 5:
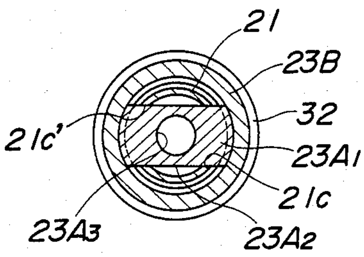
FIG. 5 is a sectional view taken along line V—V in FIG. 4.

The mounting means 23 comprises an externally threaded member 23A fitted in an axially intermediate portion of the measuring instrument holder 21, and an annular flange member 23B threadedly fitted on an end of the externally threaded member 23A. As best shown in FIG. 5, the externally threaded member 23A is fitted in the holder 21 in such a manner that it radially extends through a pair of diametrically opposite generally rectangular slits 21*c* formed in the peripheral wall of the axially intermediate portion of the holder 21, as well as the aforementioned larger-diameter hole 21*b* of the holder 21. The outer peripheral surface of the externally threaded member 23A comprises a pair of diametrically opposite threaded portions $23A_1$ radially outwardly projected from the respective slits 21*c*, 21*c* of the holder 21, and a pair of diametrically opposite parallel flat portions $23A_2$ located in part within the larger-diameter hole 21*b* of the holder 21 and disposed in face-to-face contact with respective opposite axially extending lateral side walls 21*c*', 21*c*' of the slits 21*c*, 21*c* of the holder 21. Due to the face-to-face contact with the lateral side walls 21*c*', 21*c*' of the slits 21*c*, 21*c*, the externally threaded member 23A is prohibited from being circumferentially displaced relative to the holder 21. The axial size of the slits 21*c*, 21*c* is set at a value larger by a suitable amount than that of the externally threaded member 23A so that the externally threaded member 23A is axially movable along the slits 21*c*, 21*c* relative to the holder 21 through a suitable stroke. The root diameter of the screw threads of the threaded portions $23A_1$, $23A_1$ of the externally threaded member 23A is set at a value at least larger than the outer diameter of the axially intermediate portion of the measuring instrument holder 21. The externally threaded member 23A has a hole $23A_3$ with a smaller diameter and a hole $23A_4$ with a larger diameter, continuously formed along the axis of the member 23A, respectively, at a half portion closer to the support means 22 and the other half portion closer to the urging means 24, with a radially extending spring seating surface $23A_5$ formed between the two holes $23A_3$, $23A_4$. The annular flange member 23B has a much smaller axial size than that of the externally threaded member 23A, and threadedly fitted on an end of the screw threaded portions $23A_1$, $23A_1$ closer to the support means 22. Further, the smaller-diameter hole $23A_3$ of the externally threaded member 23A has a diameter larger than the outer diameter of the probe 29*b* of the dial gauge 29.

The urging means 24 comprises a hollow tubular spring seat 24A axially slidably fitted in the larger-diameter hole 21*b* of the measuring instrument holder 21, a compression coiled spring 24B interposed between the spring seat 24A and the spring seating surface $23A_5$ of the externally threaded member 23A, and stopper means 24C prohibiting the spring seat 24A from being axially displaced toward the open end of the larger-diameter hole 21*b* in the holder 21 beyond a predetermined axial location to thereby prevent disengagement of the spring seat 24A from the larger-diameter hole 21*b*. The stopper means 24*c* is formed by an annular groove 21*d* formed in the inner peripheral surface of the larger-diameter hole 21*b* of the holder 21, and a snap ring fitted in the annular groove 21*d* and adapted to be engaged by an annular stepped shoulder 24A formed in the outer peripheral surface of the spring seat 24A.

The outer diameter of the aforementioned other end portion of the measuring instrument holder 21 is set at such a value as to enable the same other end portion to be movably fitted through a through hole 32*d* defined within a hollow tubular member 32 of the fuel injection valve 30 in which the second nozzle spring 37 (FIG. 6) is accommodated. The inner diameter of the large-sized hole 21*b* of the holder 21 is set at such a value as to permit the spring seating portion 34*a* of the second movable spring seat 34 to be movably fitted in the hole 21*b*. The outer diameter of the externally threaded member 23A of the mounting means 23 is set at such a value as to permit threaded engagement of the externally threaded member 23A with a tapped end portion 32*b* of the through hole 32*a* of the hollow tubular member 32.

The manner of adjusting the initial injection lift of the double-injection type fuel injection valve 30 shown in FIG. 4 by the use of the adjusting device 20 constructed as above will now be described.

Figure 6:
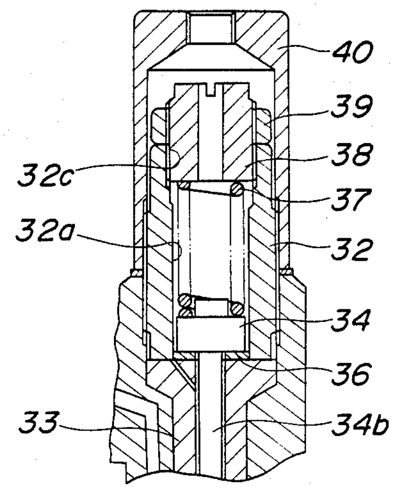
FIG. 6 is a fragmentary longitudinal sectional view of the fuel injection valve in FIG. 4 which is in an assembled state.

The adjusting member 38 shown in FIG. 6 for adjusting the setting load of the second nozzle spring 37 is removed from the nozzle holder 31 of the fuel injection valve 30, followed by removing the second nozzle spring 37 and the second movable spring seat 34 from the nozzle holder 31. Then, the push rod 34*b* of the second movable spring seat 34 thus removed is fitted into a small hole formed in a flat surface of a measuring stand, not shown, such that the end face of the spring seating portion 34*a* of the second movable spring seat 34 facing the push rod 34*b* is brought into face-to-face contact with the above flat surface of the measuring stand.

The probe 29*b* of the dial gauge 29 is fitted through the smaller-diameter hole 21*a* of the measuring instrument holder 21, and the support rod 29*a* of the dial gauge 29 is fastened to the holder 21 by means of the screw chuck 22. Then, a middle portion of the holder 21 is gripped by hand and vertically pushed against the flat surface of the measuring stand so as to bring the lower end face $24A_2$ of the hollow tubular spring seat 24A into urging contact with the spring seating surface 34*c* of the spring seating portion 34*a* of the second movable spring seat 34 in the large-sized hole 21*a*, and at the same time bring the lower open end face 21*e* of the holder 21 into urging contact with the flat surface of the measuring stand. Thus, tip of the probe 29*b* of the dial gauge 29 is brought into contact with the head 34*d* of the second movable spring seat 34, and at the same time the spring 27 is compressed by the spring seating surface 34*c* of the second movable spring seat 34, thereby positively holding the second movable spring seat 34 in close face-to-face contact with the flat surface of the measuring stand by the force of the spring 27. At this time, the pointer of the dial gauge 29 is set to zero.

Thereafter, the second movable spring seat 34 is removed from the measuring stand, and then mounted into the nozzle holder 31, followed by fitting the measuring instrument holder 21 into the hollow tubular threaded member 32 in the nozzle holder 31 which has the adjusting threaded member 38 and the second nozzle spring 37 previously removed therefrom. To be specific, an end portion of the holder 21 is inserted into the spring-accommodating hole 32*a* of the hollow tubular threaded member 32, and the externally threaded member 23A of the mounting means 23 is screwed into the tapped end portion 32*b* of the the spring-accommodating hole 32*a* until the annular flange member 23B comes into contact with the upper end of the hollow tubular threaded member 32. Since the mounting means 23 is prohibited from being circumferentially displaced relative to the holder 21, by rotating the holder 21 the externally threaded member 23A is rotated together with the rotating holder 21 to be automatically screwed into the hollow tubular threaded member 32.

After having thus been mounted into the hollow tubular threaded member 32, the measuring instrument holder 21, in which the mounting means 23 is axially movable relative thereto through a suitable stroke as previously noted, is pushed by hand toward the nozzle holder 31 and displaced toward same until its lower end face 21*e* comes into urging contact with the upper end face 33*a* of the spacer 33 fitted in the nozzle holder 31. At the same time, tip of the probe 29*b* of the dial gauge 29 comes into contact with the head 34*d* of the second movable spring seat 34 and also the end face 24$A_2$ of the spring seat 24A of the urging means 24 comes into urging contact with the spring seating surface 34*c* of the second movable spring seat 34 within the large-sized hole 21*b* of the holder 21 so that the coiled spring 27 becomes compressed to bring tip of the push rod 34*b* of the second movable spring seat 34 into urging contact with the head 35*a* of the first movable spring seat 35 coupled to the nozzle needle 41 for lifting therewith, which is in its seated position. On this occasion, since the length $l_2$ of the push rod 34*b* of the second movable spring seat 34 is set at a value slightly larger than the distance $l_1$ between tip of the head 35*a* of the first movable spring seat 35 and the upper end seating surface 33*a* of the spacer 33 which is locked in axial position by the nozzle holder 31, the second movable spring seat 34 becomes detached from the upper end face 33*a* of the spacer 33 so that the pointer of the dial gauge 22 points a value h. Then, a shim 36 is selected which has a thickness equal to the sum of this value h and a desired value $\Delta l$ of initial injection lift, and placed between the end face of the spring seating portion 34*a* of the second movable spring seat 34 facing the push rod 34*b* and the upper end face 33*a* of the spacer 33, as shown in FIG. 6, thereby accurately setting the gap for the initial injection lift of the fuel injection valve 30.

After completion of various adjustments of the fuel injection valve including the above described adjustment of the initial injection lift, as shown in FIG. 6, the second nozzle spring 37 is mounted into the spring-accommodating hole 32*a* of the hollow tubular threaded member 32, and then the adjusting threaded member 38 is screwed into the open end 32*c* of the member 32 to adjust the setting load of the second nozzle spring 37, followed by locking the adjusting threaded member 38 in its adjusted position by means of a lock nut 39, and screwing a cap 40 onto the hollow tubular threaded member 32.

A substantially identical adjusting manner with the aforedescribed manner of adjustment of the initial injection lift gap can be applied to adjustment of the initial injection lift gaps of the double-injection type fuel injection valve disclosed in Japanese Provisional Utility Model Publication No. 57-145760, and many other fuel injection valves of this type.

According to the adjusting device of the invention having the aforedescribed structure and operation, a very small number of component parts of the fuel injection valve has only to be removed from the valve in adjusting the initial injection lift, dispensing with the need of incorporating the second nozzle spring into the adjusting device and therefore facilitating the adjusting operation.

Further, during the adjusting operation, the built-in spring of the adjusting device positively holds the second movable spring seat in close contact with the first movable spring seat, thereby providing a very reliable adjusted value.

Still further, since the mounting means of the adjusting device according to the invention is not rigidly coupled to the measuring instrument holder 21, allowing axial displacement and slight radial displacement of the externally threaded member 23A relative to the holder 21, and also the small-sized hole 23$A_3$ of the externally threaded member 23A is larger in diameter than the probe 29*b* of the measuring instrument 29, irregularities in the screw thread of the hollow tubular member 32 of the fuel injection valve can be absorbed and will not affect the accuracy of the measured value obtained.

Having the above-mentioned excellent results, the adjusting device according to the invention enables even staff at a service station or the like to make adjustment of the initial injection lift and ascertainment of the adjusted lift value with accuracy and ease.

While a preferred embodiment of the invention has been described, variations thereto will occur to those skilled in the art within the scope of the present inventive concepts which are delineated by the following claims.

What is claimed is:

1. An adjusting device for a double-injection fuel injection valve of the type having a nozzle needle, a first nozzle spring, a first movable spring seat coupled to said nozzle needle for lifting together with said nozzle needle and supporting said first nozzle spring, a second nozzle spring, a second movable spring seat supporting said second nozzle spring, a seat held stationary at a predetermined axial location in said fuel injection valve, on which said second movable spring seat is seatable, a shim interposed between said second movable spring seat and said seat and maintaining said second movable spring seat in a position seated on said seat spaced from said first movable spring seat in a seated position thereof by a predetermined gap determining a desired initial injection lift of said nozzle needle, and a hollow member accommodating at least said second nozzle spring, said adjusting device being used to adjust said predetermined gap, said adjusting device comprising: a hollow tubular holder for holding a measuring instrument having an elongate probe, said holder having a through hole formed therein along an axis thereof for said elongate probe to extend therethrough; support means provided at one end portion of said holder for supporting said measuring instrument; mounting means provided at an axially intermediate portion of said holder for mounting said holder on said hollow member of said fuel injection valve while allowing axial displacement of said holder relative to said hollow member; and urging means provided in said through hole of said holder at another end portion of said holder for urging said second movable spring seat of said fuel injection valve against said seat to hold said second movable spring seat in close contact with said seat; said support means, said mounting means and said urging means being so constructed as to permit free axial movement of said elongate probe of said measuring instrument therethrough.

2. An adjusting device as claimed in claim 1, wherein said hollow member of said fuel injection valve has a threaded inner peripheral surface, said holder having a peripheral wall, said mounting means comprising a pair of diametrically opposite generally rectangular slits formed in said peripheral wall of said holder at said axially intermediate portion thereof and each having a pair of opposite axially extending lateral side walls, an externally threaded member fitted in said slits of said holder, said externally threaded member having an outer peripheral surface thereof formed with a pair of diametrically opposite threaded portions radially outwardly projected from respective ones of said slits of said holder, and a pair of diametrically opposite parallel flat portions located in part within said through hole of said holder and disposed in face-to-face contact with respective ones of said lateral side walls of said slits of said holder, each of said slits being larger in axial size than said externally threaded member, whereby said externally threaded member is axially movable along said slits and prohibited from being circumferentially displaced relative to said holder, and an annular flange member threadedly fitted on said threaded portions of said externally threaded member, said annular flange member being smaller in axial size than said threaded portions, part of said threaded portions of said externally threaded member not occupied by said annular flange member being adapted for threaded engagement with said threaded inner peripheral surface of said hollow member of said fuel injection valve.

3. An adjusting device as claimed in claim 2, wherein said urging means comprises a hollow spring seat axially slidably fitted in said through hole of said holder at said another end portion of said holder for urging contact with said second movable spring seat of said fuel injection valve, a compression coiled spring interposed between said hollow spring seat and said externally threaded member of said mounting means, and stopper means prohibiting said hollow spring seat from being axially displaced beyond a predetermined axial location in said through hole of said holder for preventing disengagement of said hollow spring seat from said through hole.

4. An adjusting device as claimed in claim 3, wherein said hollow spring seat has a hollow tubular member having an outer peripheral surface thereof formed with an annular stepped shoulder, said stopper means comprising an annular groove formed in said through hole of said holder, and a snap ring fitted in said annular groove for engagement with said annular stepped shoulder of said hollow spring seat.

5. An adjusting device as claimed in claim 2, wherein said externally threaded member has a through hole formed therein along an axis thereof, through which said elongate probe of said measuring instrument is to extend, said through hole of said externally threaded member being larger in diameter than said elongate probe.

6. An adjusting device as claimed in claim 1, wherein said support means comprises a screw chuck.

* * * * *